(12) United States Patent
Vincent

(10) Patent No.: US 9,906,453 B2
(45) Date of Patent: Feb. 27, 2018

(54) SYSTEM AND METHOD FOR MODIFYING PER HOP BEHAVIOR OF ONE OR MORE EXPEDITED FORWARDING PACKETS

(71) Applicant: Wipro Limited, Bangalore (IN)

(72) Inventor: Jimmy Vincent, Thrissur Dist. (IN)

(73) Assignee: WIPRO LIMITED, Bangalore (IN)

( * ) Notice: Subject to any disclaimer, the term of this patent is extended or adjusted under 35 U.S.C. 154(b) by 176 days.

(21) Appl. No.: 14/979,757

(22) Filed: Dec. 28, 2015

(65) Prior Publication Data

US 2017/0142014 A1  May 18, 2017

(30) Foreign Application Priority Data

Nov. 13, 2015  (IN) .......................... 6132/CHE/2015

(51) Int. Cl.

| | |
|---|---|
| G01R 31/08 | (2006.01) |
| H04L 12/801 | (2013.01) |
| H04L 12/841 | (2013.01) |
| H04L 12/851 | (2013.01) |
| H04L 12/823 | (2013.01) |
| H04L 12/26 | (2006.01) |
| H04L 12/723 | (2013.01) |
| H04L 12/835 | (2013.01) |
| H04L 12/833 | (2013.01) |

(52) U.S. Cl.
CPC .......... *H04L 47/17* (2013.01); *H04L 43/0864* (2013.01); *H04L 45/50* (2013.01); *H04L 47/2408* (2013.01); *H04L 47/283* (2013.01); *H04L 47/30* (2013.01); *H04L 47/31* (2013.01); *H04L 47/32* (2013.01); *H04L 47/34* (2013.01)

(58) Field of Classification Search
USPC ....... 370/229, 230, 231, 232, 233, 234, 236, 370/394
See application file for complete search history.

(56) References Cited

U.S. PATENT DOCUMENTS 7,337,206 B1 * 2/2008 Wen ........................ H04L 43/00
370/235
7,590,152 B1 9/2009 Filsfils
(Continued)

OTHER PUBLICATIONS

Davie, et. al., RFC 3246—An Expedited Forwarding PHB (Per Hop Behavior), Mar. 2002, pp. 1-16.*
(Continued)

*Primary Examiner* — Phuongchau Ba Nguyen
(74) *Attorney, Agent, or Firm* — Finnegan, Henderson, Farabow, Garrett & Dunner, LLP

(57) ABSTRACT

An escalated expedited forwarding system, for modifying per hop behavior of one or more Expedited Forwarding (EF) packets for a session in a communication network, the system comprising: a memory; a processor coupled to the memory storing processor executable instructions which when executed by the processor causes the processor to perform operations comprising: determining, by an escalated expedited forwarding system, at least one of latency, jitter and average jitter associated with the one or more EF packets for the session; marking, by the escalated expedited forwarding system, one or more EF packets based on the at least one of latency, jitter and average jitter; and modifying, by the escalated expedited forwarding system, the per hop behavior of the one or more marked EF packets.

14 Claims, 5 Drawing Sheets

(56) References Cited

U.S. PATENT DOCUMENTS

2002/0191622 A1    12/2002  Zdan
2006/0239188 A1*   10/2006  Weiss .................. H04L 47/10
                                                       370/229
2010/0054241 A1*    3/2010  Shah ................... H04L 45/00
                                                       370/389
2015/0180791 A1     6/2015  Bentley et al.
2017/0104629 A1*    4/2017  Cobb .................. H04L 41/0816

OTHER PUBLICATIONS

Scott Poretsky et al., "Terminology for Benchmarking Network-layer Traffic Control Mechanisms; draft-ietf-bmwg-dsmterm-13.text", Jun. 1, 2006, *ISOC 4,* vol. bmwg, No. 13, 32 pages.
European Search Report from the European Patent Office in counterpart European Application No. 16155679.2, dated Mar. 16, 2017, 9 pages.

* cited by examiner

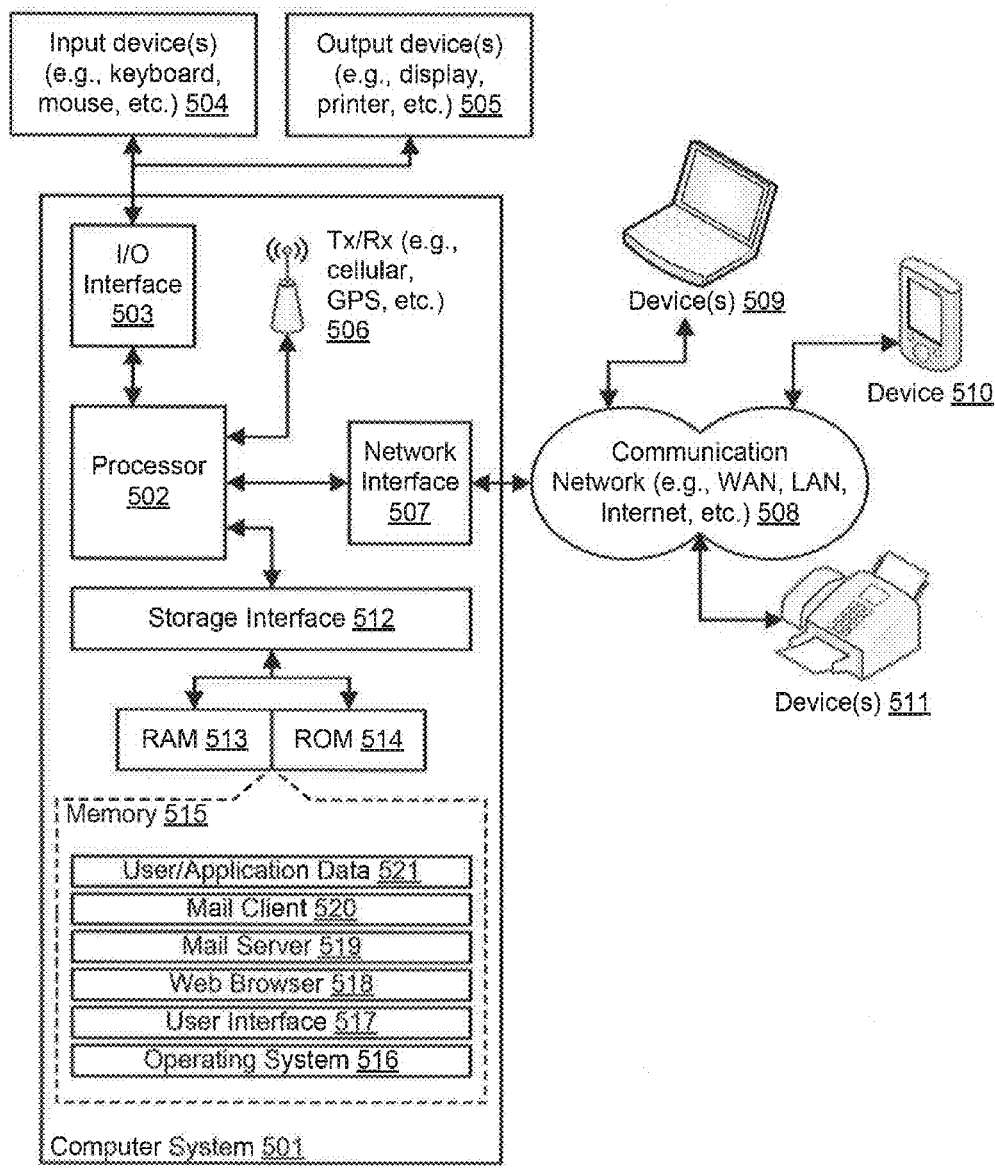
FIG. 5: Example Computer System

SYSTEM AND METHOD FOR MODIFYING PER HOP BEHAVIOR OF ONE OR MORE EXPEDITED FORWARDING PACKETS

PRIORITY CLAIM

This U.S. patent application claims priority under 35 U.S.C. § 119 to Indian Application No. 6132/CHE/2015, filed Nov. 13, 2015. The aforementioned applications are incorporated herein by reference in their entirety.

TECHNICAL FIELD

This disclosure relates generally to computer networking architecture, and more particularly to system and method for modifying per hop behavior of one or more Expedited Forwarding (EF) packets for a session in a communication network.

BACKGROUND

Typically, communication network may need to support real-time traffic for one or more media applications such as audio, video, high definition graphics. Performance of the one or more media applications may be highly dependent on the communication network behavior. The communication network may not be inherently circuit-switched. The communication network may be designed to provide best-effort service for delivery of one or more packets. The communication network may be designed to run across virtually any network transmission media and system platform. Typically latency and jitter may get developed in the communication network especially for differential services due to one or more network conditions such as network congestion, long-haul sessions, burst traffic.

Latency of the one or more packets from a source/intermediate node to destination node may be caused due to the propagation delay, queuing delay and processing delay experienced at the destination node, the source node and one or more intermediate nodes during network transition. Jitter may be caused due to variation in queuing delay at the one or more intermediate nodes and due to dynamic changes in traffic path. For the differential services, most of the queuing delay at the one or more intermediate nodes may be controlled by defining per hop behavior as Expedited Forwarding (EF), which ensures low jitter and low latency at each of the one or more intermediate nodes (as defined in RFCs 1349, 2598, 3246). However, Expedited Forwarding (EF) per hop behavior may fail to intelligently handle the per hop behavior of the packet considering the further delay and jitter that packet could incur during transition towards the destination node.

SUMMARY

A method for modifying per hop behavior of one or more Expedited Forwarding (EF) packets for a session in a communication network, the method comprising: determining, by an escalated expedited forwarding system, at least one of latency, jitter and average jitter associated with the one or more EF packets for the session; marking, by the escalated expedited forwarding system, one or more EF packets based on the at least one of latency, jitter and average jitter; and modifying, by the escalated expedited forwarding system, the per hop behavior of the one or more marked EF packets.

An escalated expedited forwarding system, for modifying per hop behavior of one or more Expedited Forwarding (EF) packets for a session in a communication network, the system comprising: a memory; a processor coupled to the memory storing processor executable instructions which when executed by the processor causes the processor to perform operations comprising: determining, by an escalated expedited forwarding system, at least one of latency, jitter and average jitter associated with the one or more EF packets for the session; marking, by the escalated expedited forwarding system, one or more EF packets based on the at least one of latency, jitter and average jitter; and modifying, by the escalated expedited forwarding system, the per hop behavior of the one or more marked EF packets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
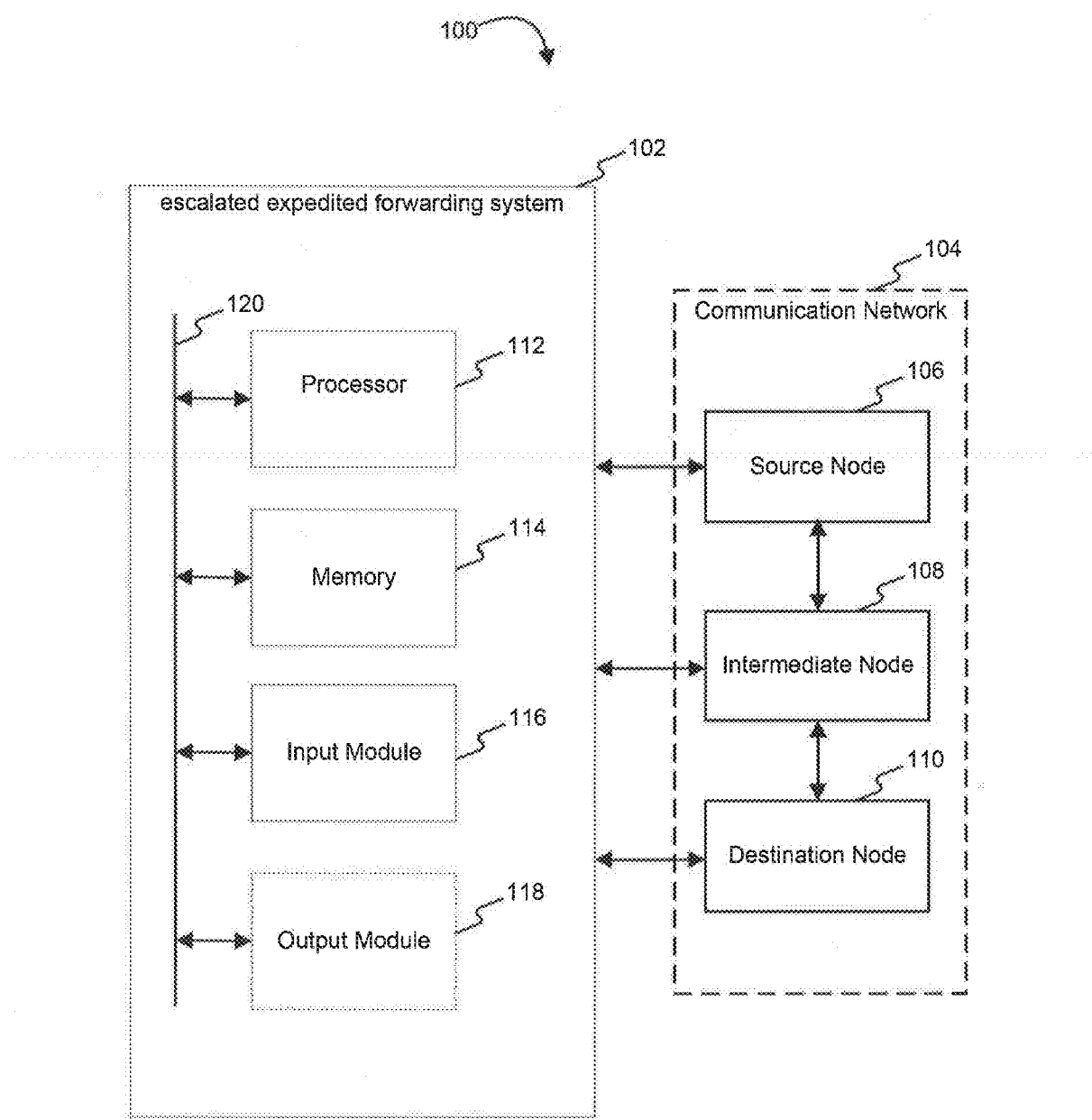
FIG. 1 illustrates an exemplary environment with an escalated expedited forwarding system for modifying per hop behavior of one or more Expedited Forwarding (EF) packets for a session in a communication network.

FIG. 1 illustrates an exemplary environment 100 with an escalated expedited forwarding system 102 for modifying per hop behavior of one or more Expedited Forwarding (EF) packets for a session in a communication network 104. The exemplary environment 100 may include the escalated expedited forwarding system 102 and communication network 104. The communication network 104 may be an Internet protocol (IP) network. The communication network 104 may need to support real-time traffic for media applications such as audio, video, high definition graphics. Performance of such media application may highly dependent on the communication network 104 behavior. The communication network 104 may not be inherently circuit-switched. The communication network 104 may be designed to provide best-effort service for delivery of one or more packets. The one or more packets may be real-time packets, IP packets and non EF and EF packets. The communication network 104 may be designed to run across virtually any network transmission media and system platform. The communication network 104 may comprise of one or more nodes. One or more nodes may comprise network elements such as router. The one or more nodes may be categorized as a source node 106, intermediate node 108, and destination node 110. The source node 106 may be the network element from which the one or more packet originate. The intermediate node 108 may be the network element through which the one or more packets may transit to reach the destination node 110. The destination node 110 may be the network element the one or more packets may be designated to finally reach. The escalated expedited forwarding system 102 may include a processor 112, a memory 114, an input module 116, and an output module 118. While not shown, the exemplary environment 100 may include additional components, such as database etc. which are well known to those of ordinary skill in the art and thus will not be described here.

The escalated expedited forwarding system 102 may modify per hop behavior of one or more Expedited Forwarding (EF) packets for a session in a communication network 104 and is described with examples herein, although the escalated expedited forwarding system 102 may perform other types and functions. The escalated expedited forwarding system 102 may include a processor 112, a memory 114, an input module 116, and an output module 118 which may be coupled together by bus 120, although the escalated expedited forwarding system 102 may comprise other types and numbers of element in other configurations.

Processor 112 may execute one or more compute executable instructions stored in the memory 114 for the methods illustrated and described with reference to the examples herein, although the processor(s) can execute other types and numbers of instructions and perform other types and numbers of operations. The processor(s) 112 may comprise one or more central processing units ("CPUs") or general purpose processors with one or more processing cores, such as AMD® processor(s), although other types of processor(s) could be used (e.g., Intel®).

The memory 114 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. The memory 114 may store one or more non-transitory computer-readable instructions of this technology as illustrated and described with reference to the examples herein that may be executed by the one or more processor(s) 112.

The input module 116 may receive transit information associated with the one or more packets during transit of the one or more packets through the communication network 104. The transit information associated with the one or more packets may be round trip time from the source or a particular intermediate node to the destination node associated with each of the one or more packets, network congestion, long-haul sessions, burst traffic, or the like.

The output module 116 may link the escalated expedited forwarding system 102 with the one or more node in the communication network 104 to modify the per hop behavior.

Figure 2:
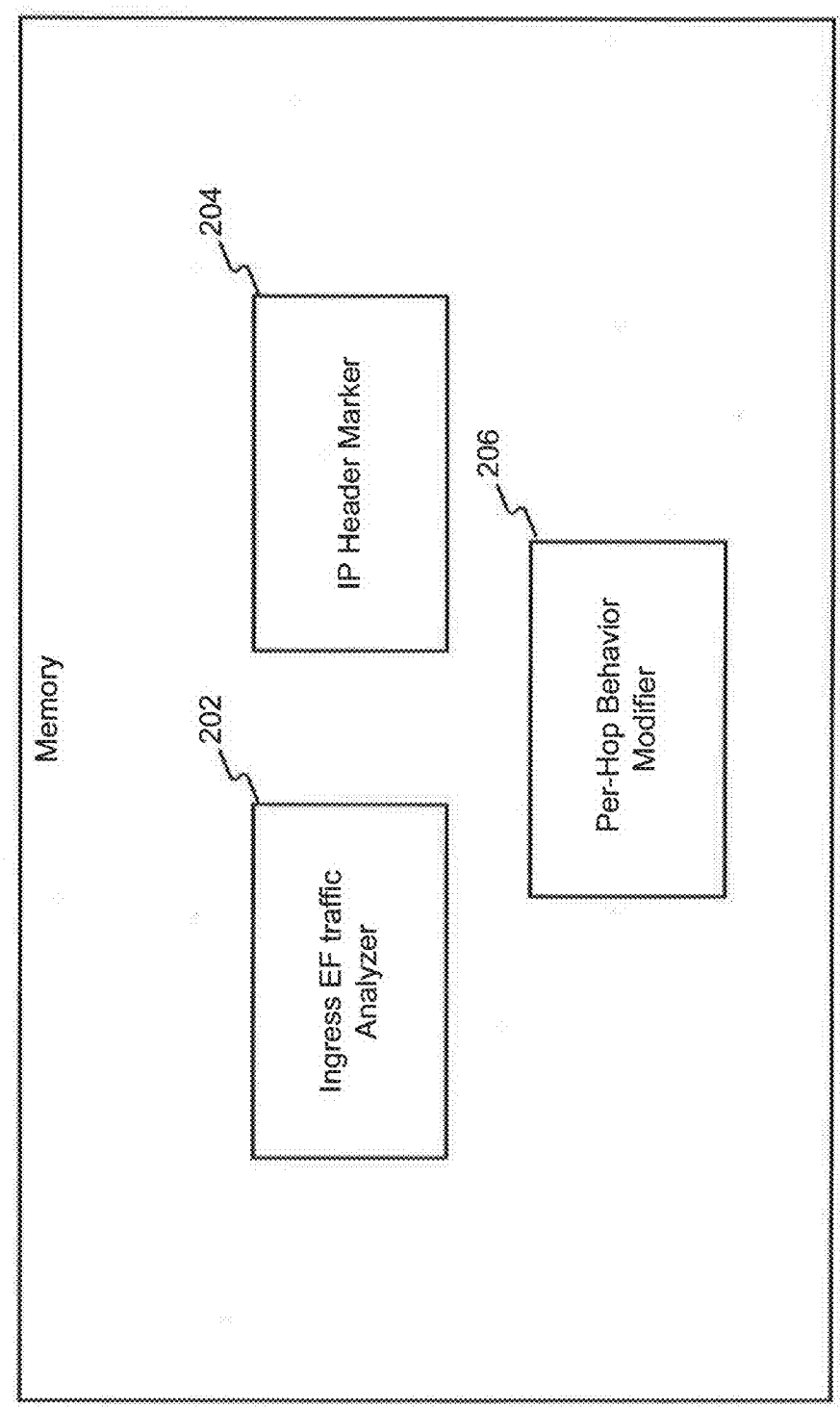
FIG. 2 illustrates memory which may include ingress traffic analyzer 202, IP header marker and per hop behavior module.

FIG. 2 illustrates memory 114 which may include ingress traffic analyzer 202, IP header marker 204 and per hop behavior module 206. The escalated expedited forwarding system 102 may modify per hop behavior of one or more Expedited Forwarding (EF) packets for a session in a communication network. The ingress traffic analyzer 202 may monitor round trip time RTT associated with the one or more EF packets for the session towards the destination node for a pre-configured time interval. The round trip time (RTT) associated with the one or more EF packets for the session may be time the one or more EF packets may take to reach the destination node plus time taken for an acknowledgment of the one or more EF packets receipt reaches source node or an intermediate node where the Extended expedited forwarding technique is applied. All the RRT parameters 1) RTT(minimum), 2) RTT (average) and 3) RTT (maximum) may be determined by existing ICMP protocol and ECHO mechanism as defined by RFCs (792, 1122). The ingress traffic analyzer 202 may determine at least of latency and jitter of the one or more packets per session based on the RTT. The latency may be determined by comparison of average of the monitored RTT and a preconfigured threshold RTT. The average of the monitored RTT may be a total RTT for each of the one or ore packets divided by number of the one or more packets transmitted over the pre-configured time interval. If the average of the monitored RTT exceeds the preconfigured latency threshold RTT, latency may be determined at the node. For example, as per ITUT.G.114 latency is present at the node if the average RTT is less more than 150 ms. Hence the preconfigured threshold RTT may be set as 100 ms considering some budgeting. The jitter may be determined based on comparison of difference of maximum monitored RTT and minimum monitored RTT with a pre-configured jitter threshold.

$$\text{RTT (max)}-\text{RTT (min)} > \text{Preconfigured Jitter Threshold} \qquad \text{Equation 1}$$

For example, for a voice applications/codecs, 20 msec is the inter packet interval, the default jitter range (Threshold 2) is considered as 10 ms after some budgeting. Average jitter may be determined based on comparison of difference between current RTT average and previous RTT average with a preconfigured average jitter threshold.

$$\text{Current RTT (avg)}-\text{Previous RTT (avg)} > \text{Preconfigured Average Jitter Threshold} \qquad \text{Equation 2}$$

For example, for a voice applications/codec, the inter packet interval may be 20 msec, the preconfigured average jitter threshold may considered as 8 ms after some budgeting. The EF packet congestion or delay may be detected if at least one of latency, jitter or average jitter cross the corresponding pre-configured thresholds.

After determining at least one of latency, jitter, and average jitter, the escalated expedited forwarding system 102 may mark one or more EF packets. The marking of the one or more EF packets per session may be changing Internet Protocol (IP) header type of service frame of the one or more packets. The IP header may be a prefix of the one or more EF packet. The IP header may contain information about IP version, source IP, destination IP, time-to-live, type of service (ToS). The ToS field may be a six-bit Differentiated Services Code Point (DSCP) field and a two-bit Explicit Congestion Notification (ECN) field in the IP header. The marking of the one or more packets per session may involve changing the six-bit Differentiated Services Code Point (DSCP) field from EF marking to a bit code recognized by the escalated expedited forwarding system 102. The IP header marker 204 may change the six-bit Differentiated Services Code Point (DSCP) to a bit code recognized by the Per-Hop Behavior Modifier 206. The bit code recognized by the prioritizing module 206 may be EEF marking. The EEF marking may be preconfigured by user. The IP header marker 204 may change the six-bit Differentiated Services Code Point (DSCP) back to EF, once the EF packet congestion becomes absent.

After the one or more EF packets are marked, Per-Hop Behavior Modifier 206 may modify the per hop behavior of the one or more EF packets based on the marking. The modifying the per hop behavior of the marked one or more EF packets may comprise sequencing the marked one or more EF packets of the session to increase speed, throughput and reliability and erasing the marked one or more EF packets, if the marked one or more EF packets exceed a pre-defined ingress packet queue threshold. The Per-Hop Behavior Modifier 206 may sequence the marked one or more EF packets to provide precedence over all other non-marked one or more packets in the traffic of the communication channel 104 to increase speed, throughput and reliability of the one or more EF packets. The Per-Hop Behavior Modifier 206 may send the one or more EF packets for queuing and scheduling based on the IP header TOS frame of the one or more EF packets to create a segregation between the marked one or more EF packets and all other non-marked one or more packets present in the traffic in the communication channel 104. The segregation may be at least one of logical segregation and physical segregation. The logical segregation may be preconfigured logical channels created based on connection identification associated with one or more nodes. The physical segregation may be two separate serial buses for the marked one or more EF packets and non-marked one or more packets. The Per-Hop Behavior Modifier 206 may modify queueing function at the one or more node to support one or more queues. The queue with the marked one or more EF packets may be sent out of the source node 106 and intermediate 108 ahead of non-marked one or more packets. If the marked one or more ingress EF packets exceed a packet queue threshold, all the marked one or more EF packets are dropped from the queue.

Figure 3:
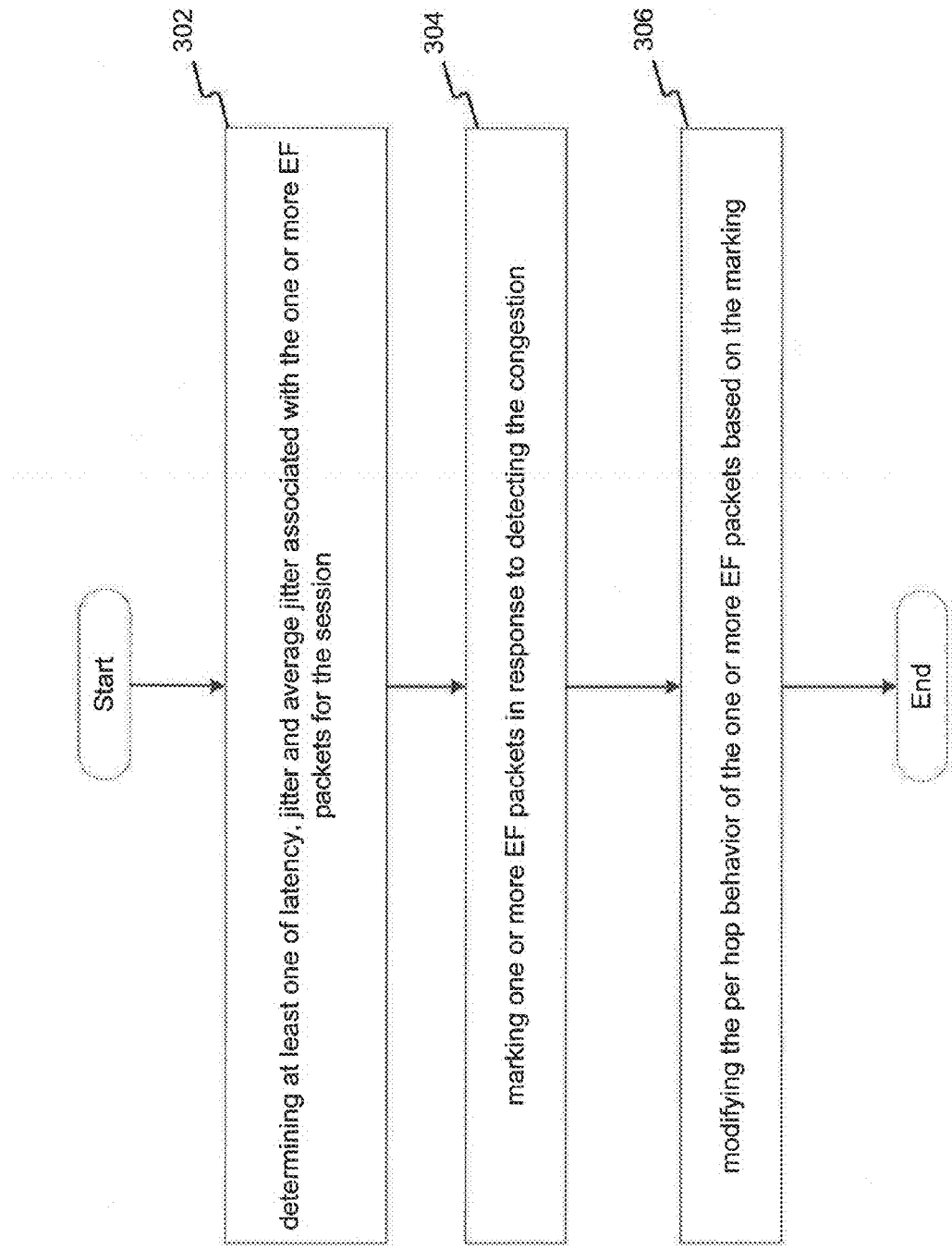
FIG. 3 illustrates a method for modifying per hop behavior of one or more packets per session at a node

FIG. 3 illustrates a method for modifying per hop behavior of one or more Expedited Forwarding (EF) packets for a session in a communication network. The method may involve determining at least one of latency, jitter and average jitter associated with the one or more EF packets for the session by an escalated expedited forwarding system 102 at step 102. Determining at least one of latency, jitter and average jitter associated with the one or more EF packets is based on monitoring of round trip time (RTT) associated with the one or more EF packets for the session for a pre-configured time interval. The ingress traffic analyzer 202 may monitor the round trip time associated with the one or more EF packets for the session for a pre-configured time interval. The round trip time (RTT) associated with the one or more EF packets for the session may be time the one or more EF packets may take to reach the destination node plus time taken for an acknowledgment of the one or more EF packets receipt reaches source node. All the RRT parameters 1) RTT(minimum), 2) RTT (average) and 3) RTT(maximum) may be determined by existing ICMP protocol and ECHO mechanism as defined by RFCs (792, 1122). The latency may be determined by comparison of average of the monitored RTT and a preconfigured threshold RTT. The average of the monitored RTT may be a total RTT for each of the one or more packets divided by number of the one or more packets transmitted over the pre-configured time interval. If the average of the monitored RTT exceeds the preconfigured latency threshold RTT, latency may be determined at the node. For example, as per ITUT.G.114 latency is present at the node if the average RTT is less than 150 ms.

Hence the preconfigured threshold RTT may be set as 100 ms considering some budgeting. The jitter may be determined based on comparison of difference of maximum monitored RTT and minimum monitored RTT with a preconfigured jitter threshold. The jitter may be determined at the node based on a comparison of difference of maximum monitored RTT and minimum monitored RTT with a preconfigured jitter threshold.

$$\text{RTT (max)}-\text{RTT (min)}>\text{Preconfigured Jitter Threshold} \qquad \text{Equation 1}$$

For example, for a voice applications/codecs, 20 msec is the inter packet interval, the default jitter range (Threshold 2) is considered as 10 ms after some budgeting. Average jitter may be determined based on comparison of difference between current RTT average and previous RTT average with a preconfigured average jitter threshold, $$\text{Current RTT (average)}-\text{Previous RTT (average)}>\text{Preconfigured Average Jitter Threshold} \qquad \text{Equation 2}$$

For example, for a voice applications/codec, the inter packet interval may be 20 msec, the preconfigured average jitter threshold may considered as 8 ms after some budgeting. The EF packet congestion or delay may be detected if at least one of latency, jitter or average jitter cross the corresponding pre-configured thresholds.

After determining at least one of latency, jitter, and average jitter, the escalated expedited forwarding system 102 may mark one or more EF packets at step 304. The marking of the one or more EF packets per session may be changing Internet Protocol (IP) header type of service frame of the one or more packets. The IP header may be a prefix of the one or more EF packet. The IP header may contain information about IP version, source IP, destination IP, time-to-live, type of service (ToS). The ToS field may be a six-bit Differentiated Services Code Point (DSCP) field and a two-bit Explicit Congestion Notification (ECN) field in the IP header. The marking of the one or more packets per session may involve changing the six-bit Differentiated Services Code Point (DSCP) field from EF marking to a bit code recognized by the escalated expedited forwarding system 102. The IP header marker 204 may change the six-bit Differentiated Services Code Point (DSCP) to a bit code recognized by the Per-Hop Behavior Modifier 206. The bit code recognized by the prioritizing module 206 may be EEF marking. The EEF marking may be preconfigured by user. The IP header marker 204 may change the six-bit Differentiated Services Code Point (DSCP) back to EF, once the EF packet congestion or delay becomes absent, After the one or more EF packets are marked, step 306 may involve modifying the per hop behavior of the one or more marked EF packets by the escalated expedited forwarding system 102. The Per-Hop Behavior Modifier 206 may modify the per hop behavior of the one or more EF packets based on the marking. The modifying the per hop behavior of the marked one or more EF packets may comprise sequencing the marked one or more EF packets of the session to increase speed, throughput and reliability and erasing the marked one or more EF packets, if the marked one or more EF packets exceed a pre-defined ingress packet queue threshold. The Per-Hop Behavior Modifier 206 may sequence the marked one or more EF packets to provide precedence over all other non-marked one or more packets in the traffic of the communication channel 104 to increase speed, throughput and reliability of the one or more EF packets. The Per-Hop Behavior Modifier 206 may send the one or more EF packets for queuing and scheduling based on the IP header TOS frame of the one or more EF packets to create a segregation between the marked one or more EF packets and all other non-marked one or more packets present in the traffic in the communication channel 104. The segregation may be at least one of logical segregation and physical segregation. The logical segregation may be pre-configured logical channels created based on connection identification associated with one or more nodes. The physical segregation may be two separate serial buses for the marked one or more EF packets and non-marked one or more packets. The Per-Hop Behavior Modifier 206 may modify queueing function at the one or more node to support one or more queues. The queue with the marked one or more EF packets may be sent out of the source node 106 and intermediate 108 ahead of non-marked one or more packets. The marked one or more EF packets exceed a packet queue threshold, all the marked one or more EF packets are dropped from the queue.

Figure 4:
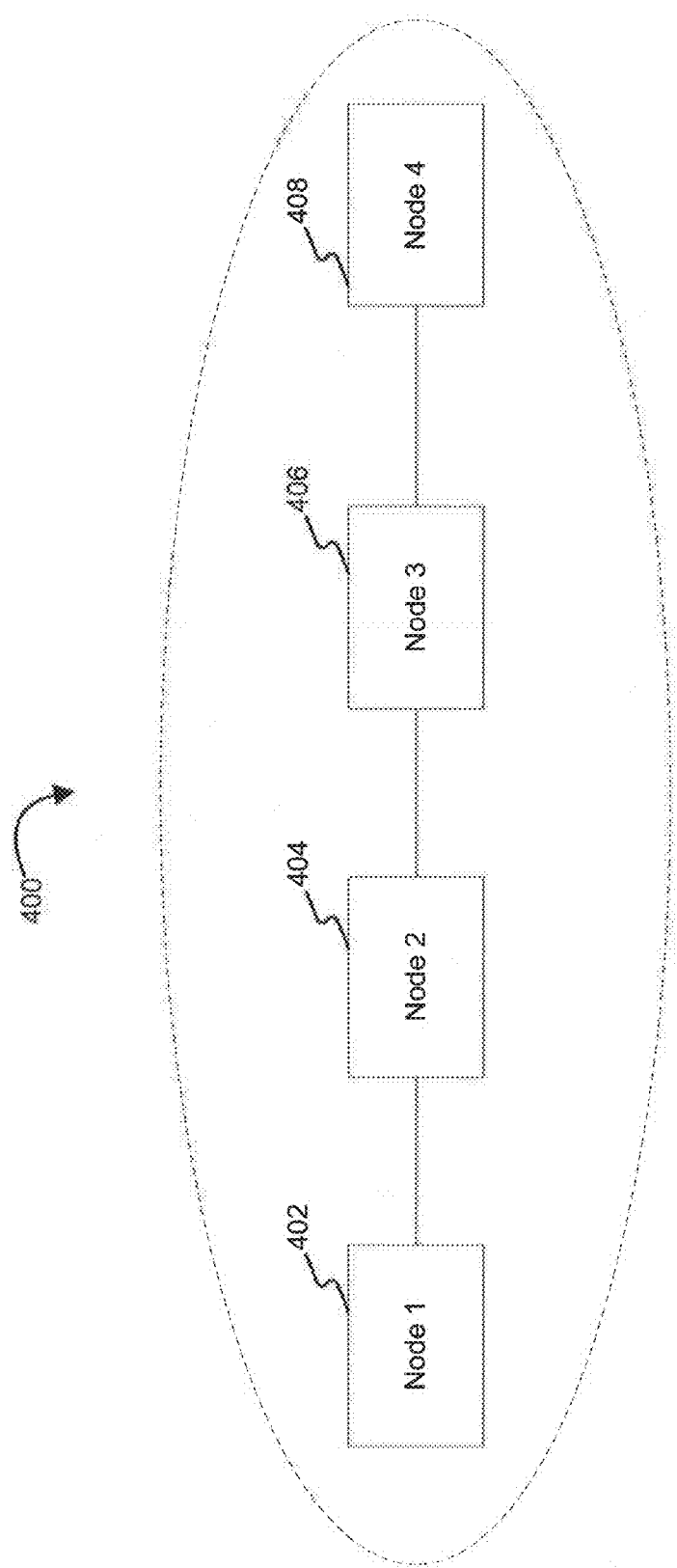
FIG. 4 illustrates an exemplary communication network with the escalated expedited forwarding system.

FIG. 4 illustrates an exemplary communication network 400 with the escalated expedited forwarding system 102. The communication network 400 may comprise Node 1 402 as a source node, Node 2 404 and Node 3 406 as intermediator nodes and Node 408 as destination node. At node1 402, the escalated expedited forwarding system 102 may determine at least one of latency, jitter and average jitter associated with the one or more EF packets for the session. The ingress traffic analyzer 202 may monitor the round trip time associated with the one or more EF packets for the session for a pre-configured time interval. The round trip tirade (RTT) associated with the one or more EF packets for the session may be time the one or more EF packets may take to reach from the a destination node plus time taken for an acknowledgment of the one or more EF packets receipt reaches originating node. The round trip time (RTT) associated with the one or more EF packets in the session may be the length of time the one or more EF packets to be sent from node1 402 plus the length of time an acknowledgment of the one or more packets to be received from node4 408. All the RRT parameters 1) RTT(min), 2) RTT(avg) and 3) RTT(max) may be determined by existing ICMP protocol and ECHO mechanism as defined by RFCs(792, 1122). The ingress traffic analyzer 202 may determine latency and jitter of the one or more packets per session for based on the RTT. The latency may be determined by comparison of average of the monitored RTT and a preconfigured threshold RTT. The average of the monitored RTT may be a total RTT for each of the one or more packets divided by number of the one or more packets transmitted over the pre-configured time interval. If the average of the monitored RTT exceeds the preconfigured threshold RTT, latency may be determined at the node. For example, as per ITUT.G.114 latency is present at the node if the average RTT is less than 150 ms. Hence the preconfigured threshold RTT may be set as 100 ms considering some budgeting. The jitter is determined based on comparison of difference of maximum monitored RTT and minimum monitored RTT with a preconfigured threshold. The jitter is determined at the node based on a comparison of difference of maximum monitored RTT and minimum monitored RTT with a preconfigured threshold 2.

$$\text{RTT (max)}-\text{RTT (min)}>\text{Preconfigured Threshold 2} \quad \text{Equation 2}$$

For example, for a voice applications/codecs, 20 msec is the inter packet interval, the default jitter range (Threshold 2) is considered as 10 ms after some budgeting. Average jitter may be determined based on comparison of difference between current RTT average and previous RTT average with a preconfigured average jitter threshold.

$$\text{Current RTT (avg)}-\text{Previous RTT (avg)}>\text{Threshold 3} \quad \text{Equation 3}$$

For example, for a voice applications/codec, the inter packet interval may be 20 msec, the default average jitter (Threshold 3) considered as 8 ms after some budgeting. The spike in ingress Expedite Forwarding (EF) traffic at the node may be detected if at least one of latency, jitter or average jitter cross the corresponding pre-configured thresholds.

Computer System

FIG. 5 is a block diagram of an exemplary computer system for implementing embodiments consistent with the present disclosure. Variations of computer system 501 may be used for implementing escalated expedited forwarding system 102. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-P BIB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS. Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID) solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, strollers, windows, widgets, etc., Graphical user interfaces (GUIs) may be employed, including, without limitation, Apple Macintosh operating systems' Aqua, IBM OS/2, Microsoft Windows (e,g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft NET, CGI scripts, Java, JavaScript, PERL, PHP, Python, WebObjects, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., list here) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML) table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described system and method for modifying per hop behavior of one or more Expedited Forwarding (EF) packets for a session in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), readonly memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for modifying per hop behavior of one or more Expedited Forwarding (EF) packets for a session in a communication network, the method comprises:
    determining, by an escalated expedited forwarding system, at least one of latency, jitter and average jitter associated with the one or more EF packets for the session;
    marking, by the escalated expedited forwarding system, one or more EF packets with Escalated Expedited Forwarding (EEF) marking in response to determining EF packet congestion based on the determined at least one of latency, jitter and average jitter, wherein the EEF marked packets are EF packets that are delayed during transmission based on the determined EF packet congestion; and
    modifying, by the escalated expedited forwarding system, the per hop behavior of the one or more marked EF packets in response to the EEF marking by:
        sequencing the one or more EEF marked packets of the session to provide precedence to the one or more EEF marked packets over all non-marked one or more packets during transmission of the one or more marked EF packets in the communication network; and
        erasing the one or more EEF marked packets, if an ingress queue for the one or more EEF marked packets exceed a pre-defined value, wherein the modification changes the transmission behavior of the one or more marked EF packets.

2. The method of claim 1 wherein determining at least one of latency, jitter and average jitter associated with the one or more EF packets is based on monitoring of round trip time (RTT) associated with the one or more EF packets for the session for a preconfigured time interval.

3. The method of claim 1, wherein latency is determined based on comparison of average of the monitored RTT and a preconfigured latency threshold.

4. The method of claim 1, wherein jitter is determined based on comparison of difference of maximum monitored RTT and minimum monitored RTT with a preconfigured jitter threshold.

5. The method of claim 1, wherein the average jitter is determined based on comparison of difference between current RTT average and previous RTT average with a preconfigured average-jitter threshold.

6. The method of claim 1, wherein marking the one or more EF packets further comprises changing an IP header type of service of the one or more EF packets.

7. The method of claim 6, wherein narking the one or more Expedited Forwarding packets further comprises changing a six-bit Differentiated Services Code Point field of the IP header of the one or more Expedited Forwarding packets from an Expedited Forwarding marking to the Escalated Expedited Forwarding marking, and
    wherein the method further comprises changing the six-bit Differentiated Services Code Point field of the IP header of the one or more marked Expedited Forwarding packets from the Escalated Expedited Forwarding marking to the Expedited Forwarding marking once the Expedited Forwarding packet congestion becomes absent.

8. An escalated expedited forwarding system, for modifying per hop behavior of one or more Expedited Forwarding (EF) packets for a session in a communication network, the system comprising:
    a memory;
    a processor coupled to the memory storing processor executable instructions which when executed by the processor causes the processor to perform operations comprising:
    determining at least one of latency, jitter and average jitter associated with the one or more EF packets for the session;
    marking one or more EF packets with Escalated Expedited Forwarding (EEF) marking in response to detecting EF packet congestion based on the determined at least one of latency, jitter and average jitter, wherein the EEF marked packets are EF packets that are delayed during transmission based on the determined EF packet congestion; and
    modifying the per hop behavior of the one or more EF packets in response to the EEF marking by:
        sequencing the one or more EEF marked packets of the session to provide precedence to the one or more EEF marked packets over all non-marked one or more packets during transmission of the one or more marked EF packets in the communication network; and
        erasing the one or more EEF marked packets, if an ingress queue for the one or more EEF marked packets exceed a pre-defined value, wherein the modification changes the transmission behavior of the one or more marked EF packets.

9. The system of claim 8, wherein the at least one of latency, jitter and average jitter associated with the one or more EF packets is determined based on monitoring of round trip time (RTT) associated with the one or more EF packets for the session for a preconfigured time interval.

10. The system of claim 8, wherein latency is determined based on comparison of the monitored RTT-average and a preconfigured latency threshold RTT.

11. The system of claim 8, wherein jitter is determined based on comparison of difference of maximum monitored RTT and minimum monitored RTT with a preconfigured jitter threshold.

12. The system of claim 8, wherein the average jitter is determined based on comparison of difference between current RTT average and previous RTT average with a preconfigured average jitter threshold.

13. The system of claim 8, wherein the one or more EF packets are marked by changing an IP header type of service of the one or more EF packets.

14. The system of claim 8, wherein the one or more Expedited Forwarding packets are marked by changing a six-bit Differentiated Services Code Point field of the IP header of the one or more Expedited Forwarding packets from an Expedited Forwarding marking to the Escalated Expedited Forwarding marking, and wherein the executable instructions, when executed by the processor, further cause the processor to change the six-bit Differentiated Services Code Point field of the IP header of the one or more marked Expedited Forwarding packets from the Escalated Expedited Forwarding marking to the Expedited Forwarding marking once the Expedited Forwarding packet congestion becomes absent.

* * * * *